United States Patent

Duckett

[11] Patent Number: 5,953,800
[45] Date of Patent: Sep. 21, 1999

[54] METHOD AND APPARATUS FOR TYING LINES

[76] Inventor: James Duckett, 415 N Townsand, Ada, Okla. 74820

[21] Appl. No.: 08/527,371

[22] Filed: Sep. 13, 1995

[51] Int. Cl.[6] .............................. A43C 7/00; F16G 11/00
[52] U.S. Cl. ...................... 24/712.1; 24/129 R; 24/712.5
[58] Field of Search .................................. 24/712.1, 712, 24/712.2, 712.5, 713.2, 712.3, 712.4, 115 F, 115 K, 115 L, 115 M, 136 R, 136 L, 129 R; 403/209, 210, 211; 36/50.1

[56] References Cited

U.S. PATENT DOCUMENTS

| | | |
|---|---|---|
| 233,475 | 10/1880 | Cook et al. . |
| 261,501 | 7/1882 | Vandermark . |
| 268,407 | 12/1882 | Hughes . |
| 424,754 | 4/1890 | Bernstein . |
| 825,753 | 7/1906 | Paul . |
| 1,050,716 | 1/1913 | Bell . |
| 1,225,623 | 5/1917 | Hall et al. ............................ 24/129 R |
| 1,291,563 | 1/1919 | Laughlin ..................... 24/40 |
| 1,531,410 | 3/1925 | Osterholt ............................. 24/712.1 |
| 2,832,116 | 4/1958 | Clevett et al. . |
| 2,911,697 | 11/1959 | Henderson ............................ 24/712.5 |
| 3,057,109 | 10/1962 | Houk . |
| 3,266,464 | 8/1966 | Davis . |
| 4,485,529 | 12/1984 | Blum ......................................... 36/50.1 |
| 4,790,048 | 12/1988 | Arnt ...................................... 24/712.1 |
| 5,333,398 | 8/1994 | Seo ......................................... 36/50.1 |
| 5,511,290 | 4/1996 | Perry et al. ........................... 24/712.1 |

FOREIGN PATENT DOCUMENTS

| | | | |
|---|---|---|---|
| 0192804 | 11/1957 | Austria ................................ 24/712.1 |
| 0964184 | 5/1957 | Germany .............................. 24/712.1 |
| 243675 | 11/1965 | Germany . |

*Primary Examiner*—Victor N. Sakran
*Attorney, Agent, or Firm*—Robert Treece

[57] ABSTRACT

An apparatus for securing lines having at least two members each member having a major aperture sized for receiving the lines to be secured, and one member having one or more minor apertures sized for receiving a line to be secured. When in an operating position, the major apertures are generally aligned and the minor apertures are positioned so that a line passing through a minor aperture will be compressed between the members to secure the line.

10 Claims, 2 Drawing Sheets

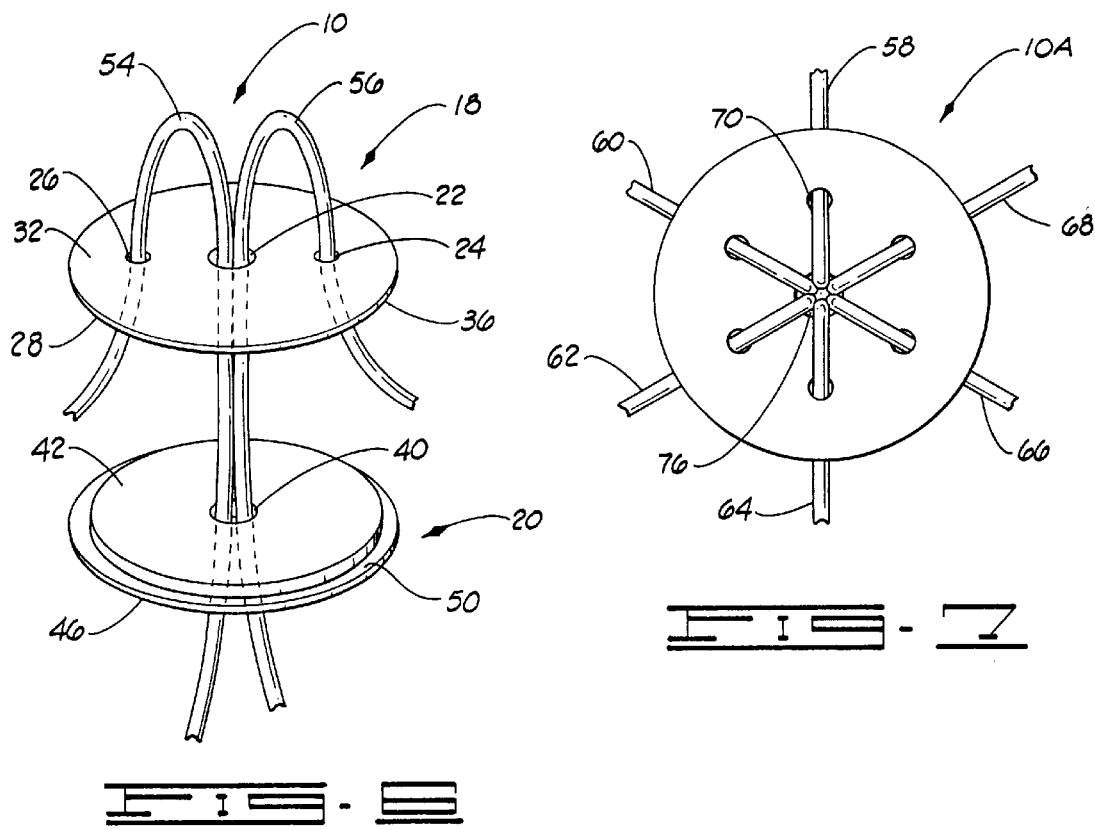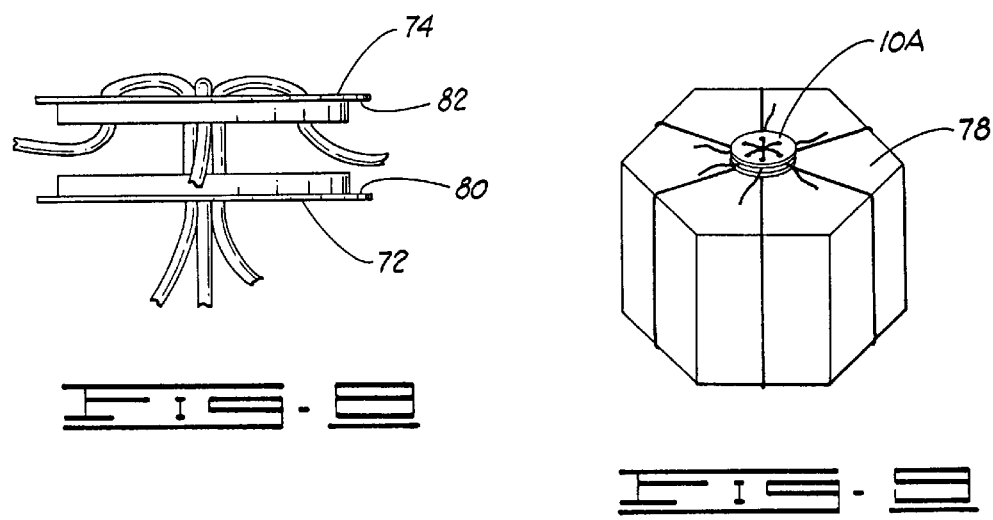

METHOD AND APPARATUS FOR TYING LINES

FIELD OF THE INVENTION

The present invention relates to a method and apparatus for securing flexible lines such as ropes, cables, straps, cords, strands, threads, twine, bands, tubing, shoestrings, drawstrings, and the like.

SUMMARY OF THE INVENTION

The methods and apparatuses currently available for securing a line to an object or securing a plurality of lines together have existed for many years. However, until the current invention none of the existing methods or apparatuses provided the combination of universally, strength, and ease of use the current invention provides. Generally when one uses a method, or apparatus, for securing lines under great stress, expensive mechanical devices are required or the lines are difficult, if not impossible, to release. The current invention provides an inexpensive apparatus wherein the harder the lines are pulled the stronger the connection, but releasing the lines is always easy.

The apparatus requires very little manual dexterity to utilize, and therefore, it is particularly useful for children and the elderly. In addition, the apparatus is so convenient that people of all ages will use and appreciate it's simplicity and strength. While the apparatus may be used on an almost infinite number of applications, it is particularly suited for use with shoestrings, drawstrings and the like. The apparatus provides the advantages of being attractive, easy to use to secure and release lines, as well as providing strong holding power.

When the apparatus of this invention is compared with some of the existing methods or apparatuses for securing lines, its advantages are even more apparent. For example, the most common method for securing the drawstrings on warmup pants is to tie the lines together. Two of the common problems with tying the drawstrings are; the knot will either not release or; it will slip. In either case, embarrassing, or at the least time consuming consequences may result. In addition, knots are difficult for young children to master, and difficult (and sometimes painful) for the elderly to use, especially if the user has arthritis. Whether young, or old, it is always an advantage to be able to quickly and securely attach the drawstrings, while knowing that they may be released just as quickly and easily. The current invention provides such speed, security, and ease of use.

Another example which demonstrates the apparatus's versatility and utility is using the apparatus to apply a tourniquet. The ability to quickly attach a tourniquet and to know it may be released just as quickly is extremely important. With the apparatus of this invention a tourniquet may be applied by simply sliding the apparatus with a line attached over the location where the tourniquet is desired and then pulling the ends of the lines. The tourniquet will then retain the pressure until adjusted. The pressure exerted by the tourniquet may be increased or reduced in a split second by either pulling harder on the lines or grabbing the apparatus to allow the lines to loosen.

Other features and advantages of the present invention will become apparent from the following detailed description when read in conjunction with the accompanying drawings and appended claims.

BRIEF DESCRIPTION OF THE DRAWINGS

FIG. 6 is a perspective view of the apparatus configured for securing two lines.

FIG. 7 is a top plan view of the apparatus configured for securing more than two lines.

FIG. 8 is a side elevation view of the apparatus of FIG. 7.

FIG. 9 is a perspective view of the apparatus configured for securing six lines around an object.

DETAILED DESCRIPTION OF THE PREFERRED EMBODIMENTS

Figure 1:
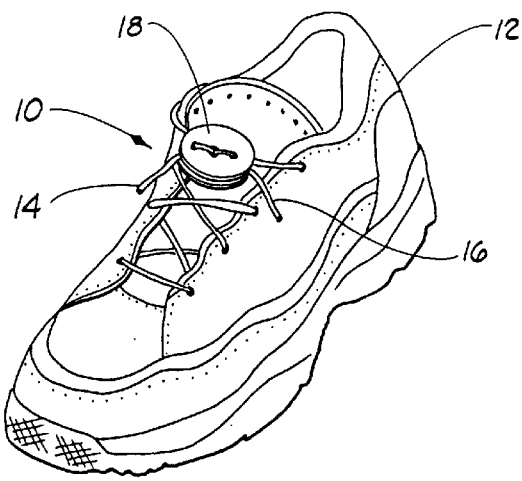
FIG. 1 is a perspective view of the apparatus of the current invention being used to secure shoestrings on a tennis shoe.
Figure 2:
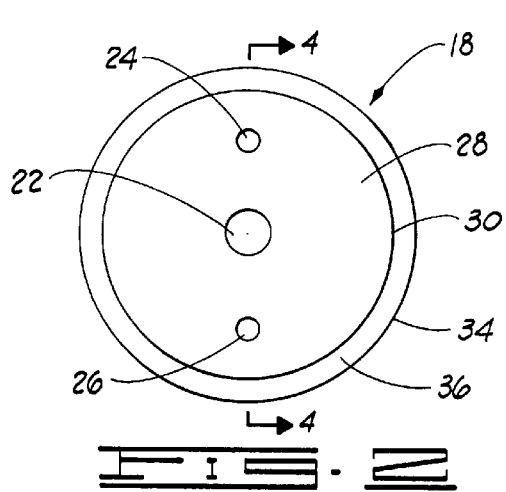
FIG. 2 is bottom plan view of one of the members of the apparatus of FIG. 1.

Referring to the drawings in detail and to FIG. 1 in particular, reference character 10 generally designates a line securing apparatus constructed in accordance with the present invention and reference character 12 designates a tennis shoe having first and second shoestrings 14 & 16, secured by the apparatus 10. As will be discussed in greater detail below, the apparatus 10 may be used with many other objects to secure lines, and the shoe 12 is pictured merely as a representative article which may utilize the apparatus 10.

Referring now to FIGS. 2–5, shown therein are first member 18 and second member 20. The first member 18 includes a major aperture 22 and minor apertures 24 & 26. First member 18 is in the shape of a disk, however it should be noted that many other shapes may be used, including by way of example and not limitation, a triangle, a rectangle, a pentagon, a hexagon, an oval, a bow tie, or an almost infinite number of other shapes. The shape of the periphery of the member is limited only by the fact the first member 18 must have sufficient area to provide a location for the minor apertures 24 & 26. If more than two lines are to be secured by the apparatus 10, then additional apertures like aperture 24 or 26 should be provided and the number of additional apertures preferably corresponds with the number of additional lines to be secured. Thus, the shape of the member 20 may be limited to allow sufficient area for all the required apertures.

The major aperture 22 is sized to accept the number of lines to be secured. In other words, the more lines to be secured by the apparatus 10, the larger the aperture 22. Preferably the aperture 22 is somewhat larger than the combined diameter of the total number of strings to be secured. For example, the first member 18 is constructed to attach two lines, and the aperture 22 is sized to accept the two lines with relative ease. While the diameter of the aperture 22 could be reduced, such a reduced diameter is not preferred since threading the lines may become difficult.

The first member 18 is also provided with a plurality of minor apertures, such as apertures 24 & 26. Each minor aperture 24 or 26 is preferably sized to accept a line. More preferably each minor aperture 24 or 26 is sized somewhat larger than the diameter of an individual line to be secured. It should be noted that while more than one line may pass through each minor aperture, such as aperture 24, it is preferable to provide an minor aperture for each line to be secured. This is because it allows the tightening of each individual line with greater ease. It is not clear whether passing more than one line through each aperture would reduce the holding power of the apparatus 10, but it is believed that the strongest configuration is one minor aperture per line to be secured.

The first member 18 also includes an inner surface 28 defined by inner periphery 30 and an outer surface 32 defined by outer periphery 34. In the preferred embodiment the outer surface 32 is somewhat larger than the inner surface 28 thereby providing a lip 36. The lip 36 provides a location for separating the first member from the second member to release the lines secured by the apparatus 10. The apparatus 10 may be constructed without a lip, but it has been found that the addition of the lip allows one to easily release secured lines. Other shapes for the lip 36 may be used, but in the preferred embodiment the lip is defined by an L-shaped notch 38.

While the first member 18 is shown as having the generally flat inner surface 28, it is possible to vary this surface so long as a portion of the surface 28 will press the lines to be secured against a portion of the inner surface 42 of the second member 20 when the lines 54 and 56 are pulled down for holding.

Figure 3:
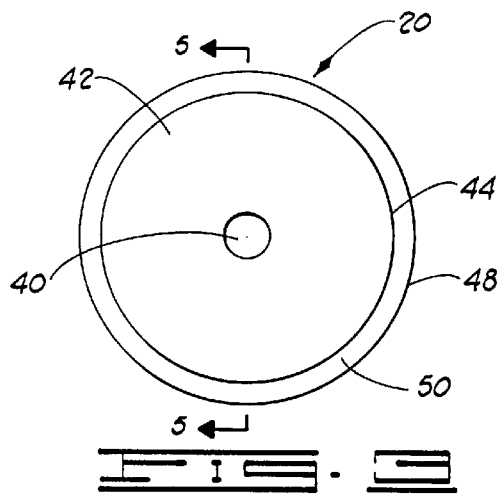
FIG. 3 is a top plan view of the other member of the apparatus of FIG. 1.
Figure 4:
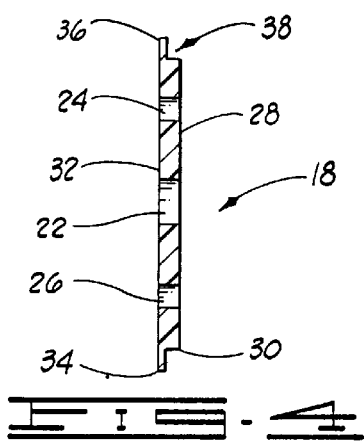
FIG. 4 is a cross-sectional view of the member shown in FIG. 2, along line 4—4.
Figure 5:
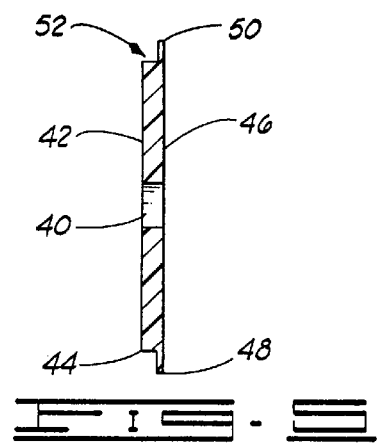
FIG. 5 is a cross-sectional view of the member shown in FIG. 3, along line 5—5.

Referring now to FIGS. 3 & 5, the second member 20 also includes a major aperture 40 for receiving the lines to be secured. As with the aperture 22 in the first member 18, the aperture 40 is preferably sized to easily receive all the lines to be secured. The second member 20 as an inner surface 42 defined by an inner periphery 44, and an outer surface 46 (FIG. 5) defined by an outer periphery 48. Preferably the second member 20 also has a lip 50 defined by an L-shaped notch 52.

FIG. 6 shows the preferred arrangement of the first member 18, the second member 20, and the lines to be secured (54 & 56) for the apparatus 10 when securing two lines. As shown, lines 54 & 56 may extend upwardly through the major aperture 40 in the second member 20, and then up through the major aperture 22 in the first member 18. The lines are then separated and line 54 extends down through minor aperture 26. While line 56 extends back down through minor aperture 24 (the directions up and down are used herein to designate the directions as shown in the figures, and not as a limitation on the position, or orientation in which the apparatus 10 may be used). As may be seen in FIG. 6, preferably the members 18 and 20 are sized, and apertures 24 and 26 are positioned so the lines will be compressed between the members 18 & 20 when the lines are pulled tight.

While the first member 18 is shown as having the generally flat inner surface 28, it is possible to vary this surface so long as a portion of the surface 28 will press the lines to be secured against a portion of the inner surface 42 of the second member 20 when the lines 54 and 56 are pulled down for holding. Similarly the inner surface 42 of the second member 20 is shown as being generally planer, however this surface may also include variations, so long as a portion of the inner surface 42 will press the lines to be secured against the corresponding portion of the inner surface 28 of the first member 18. It should also be noted that while preferably the outer surfaces 32 & 46 are generally planer, they may also be varied. However, it is believed that the relatively sharp angles in which the lines are subjected when pulled tight aid in the holding power. Thus, variations should be limited, but some variation in outer surface should not eliminate the holding strength of the apparatus 10.

FIG. 7 shows an example of the apparatus configured for more than two lines. The apparatus 10A is configured for securing six lines (58, 60, 62, 64, 66, & 68), fewer or more lines may be secured by adding or removing minor apertures such as aperture 70 (only one minor aperture being labeled herein). As may be seen in FIG. 8, the lines to, be secured should extend upward through the major aperture in the second member 72 and on upwardly through the major aperture in the first member 74. Then each line should return downwardly through the first member 74 via its own minor aperture.

FIG. 8 provides an example of an object with multiple lines, and all the lines being secured by the apparatus 10A (note, lips 80 and 82 may be included to provide a means for easily releasing the lines). The object 78 is but one of a multitude of objects which may be secured. Other objects which may be secured by the apparatus 10 or 10A include, by way of example and not limitation: dog collars; all types of draw strings such as for laundry bags, trash bags, jackets, warmup pants, men's swimwear, & etc.; caps; head bands; backpack's; tent tie down lines; glasses' straps; necklaces; hairbows; watches, tourniquets; all types of ropes and straps, such as may be used for securing objects to pallets, trucks or the like, mountain climbing ropes and etc.; even straps used as handcuffs may be secured by the apparatus; to name but a few.

The apparatus 10 or 10A may be made from almost as many materials as there are applications. However, the most preferred materials include plastic, metal, wood and the like. The only limitation being that the material should be generally shape sustaining and should be strong enough to apply pressure to the lines as they pass through the first and second members when the lines are pulled tight. Preferably, if the apparatus is to be used for small lines, the apparatus is made from plastic.

If the apparatus is made from plastic, one method of making the apparatus is to use a hole saw (such as is commonly used to drill large holes in wood), to cut out the first and second members from a piece of generally plainer plastic. Then drill bits may be used to make the major and minor apertures. This method works for making the apparatus if it is to be used for relatively small lines. A more preferred method for making the apparatus from plastic is by injection molding the apparatus, this allows the apparatus to be mass produced, and made larger for larger lines. If the apparatus is to be used on large lines such as ropes, or cables, then preferably the apparatus is made from wood, or steel.

The apparatus has such a multitude of applications that it would be impossible to list the operation for each possible application, however the following will describe how to use the apparatus in some of the more common applications. From these descriptions, one of ordinary skill in the art should be able to utilize the invention on most, if not all, other applications.

In operation as a shoestring securing device, the apparatus constructed as described above in FIGS. 1–5 is utilized. Preferably the first member 18 includes a decorated outer surface 32 to enhance the attractiveness of the apparatus. The decorative cover could include such things as pictures, engraving, leather, reflectors, lights, stop watches, clocks, or other decorative items. To secure the shoestrings, the ends of the shoestrings are passed up through the major aperture 40 in the second member 20 and then passed up through the major aperture 22 in the first member 18. The ends of the shoestrings are then separated and each shoestring is passed back through the first member with each shoestring passing through a separate minor aperture such as minor apertures 24 & 26. With this done the apparatus is in place for tightening and securing the shoestrings.

To tighten the shoestrings and secure them in place, the operator may grab the apparatus 10 or grab each shoestring in a separate hand, and then pull upwardly to tightening the shoestrings in the shoe. Once the shoe is tightened to the desired amount, the operator may then pull the ends of the shoestrings outwardly and/or downwardly to snug the first member against the second member. With this done the apparatus is in a holding position, and the shoestrings are secured so apparatus 10 will hold the shoestrings in place until released by the operator.

To release the shoestrings, the first and second members 18 & 20, are slightly separated so the shoestrings may slide through the apertures, 26, 24, 22 & 40, thereby releasing any tension on the shoestrings. Preferably the apparatus 10 is provided with one or more lips such as lips 36 & 50 to make it easier for an operator to insert a finger between the members to release the shoestrings. Another preferred configuration for enhancing ease of release is to have the second member slightly larger than the first member. With this arrangement the operator may grasp the ends of the shoestrings with one hand thereby holding the first member, and then push down on the second member 20 with the other hand, releasing the apparatus 10.

When using the apparatus 10 to secure larger lines such as straps, ropes and cables (or other heavy line), it may be necessary to insert a wedge between the first and second members to release the line. For example, if the apparatus 10 is used to secure a load on a truck, the lines may be so tight that it is difficult to separate the first and second members with one's fingers. In this case a screwdriver, tire tool, or similar device may be used to separate the members and release the lines.

In one application for this invention, the apparatus 10 may be used to lower individuals down one or more ropes, such as when descending a mountain, or escaping from a tall structure in an emergency such as a fire. To use the apparatus in this application the apparatus is attached to the line (or lines) as shown in FIG. 6, but rotated 180 degrees so that the second member is on top with the outer surface 46 up. The apparatus may be used with a single line by threading the line through the major aperture 40, the major aperture 22, and then back through a minor aperture such as 24. The operator may then sit on the outer surface 46 of the second member 20 and hold on to the line extending upward. A handle, lever, wedge or the like may be provided to selectively separate the first and second members allowing the operator to slide down the line(s) at a controlled pace.

Changes may be made in the, combinations, operations and arrangements of the various parts and elements described herein without departing from the spirit and scope of the invention as defined in the following claims.

I claim:

1. An apparatus for securing lines, comprising:

a first member with an upper surface and a lower surface, wherein the first member includes a major aperture sized for receiving the lines to be secured, and wherein the first member includes one or more minor apertures, each minor aperture sized for receiving one or more lines to be secured;

a second member having an upper surface and a lower surface, wherein the second member includes a major aperture sized for receiving the lines to be secured and is located for general alignment with the major aperture in the first member when one or more lines are secured by the apparatus, the second member being sized and shaped to apply pressure to the one or more lines as they pass between the first and second members when the apparatus is in a holding position; and wherein at least one of the first or the second members includes a lip for use when separating the first and second member when lines are secured thereby to release the lines.

2. The apparatus of claim 1 wherein the first member includes two minor apertures, and wherein each minor aperture is sized for receiving a line.

3. The apparatus of claim 2 wherein the major apertures are located in the general geographic center of the members.

4. The apparatus of claim 3, wherein the minor apertures are located on opposite sides of the major aperture in the first member.

5. The apparatus of claim 4 wherein the minor apertures are generally an equal distance from the major aperture.

6. The apparatus of claim 1 wherein the second member is larger than the first member.

7. The apparatus of claim 1 wherein the members are generally circular.

8. The apparatus of claim 1 wherein the first member includes three or more minor apertures.

9. The apparatus of claim 8 wherein the minor apertures are generally an equal distance from the major aperture and generally equally spaced from each other.

10. The apparatus of claim 1 wherein the first and the second members include a lip for use when separating the first and second members when lines are secured thereby.

* * * * *